United States Patent
Tatsuno et al.

(10) Patent No.: US 12,399,597 B2
(45) Date of Patent: *Aug. 26, 2025

(54) POSITION DETECTION SENSOR AND INPUT APPARATUS

(71) Applicant: Wacom Co., Ltd., Saitama (JP)

(72) Inventors: Koji Tatsuno, Saitama (JP); Takeshi Kobori, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,177

(22) Filed: May 7, 2024

(65) Prior Publication Data

US 2024/0288982 A1 Aug. 29, 2024

Related U.S. Application Data

(63) Continuation of application No. 17/571,416, filed on Jan. 7, 2022, now Pat. No. 12,014,018, which is a (Continued)

(30) Foreign Application Priority Data

Sep. 27, 2019 (JP) .................................. 2019-176314

(51) Int. Cl.
  *G06F 1/16*   (2006.01)
  *G06F 3/041*  (2006.01)
  (Continued)

(52) U.S. Cl.
  CPC ............ *G06F 3/046* (2013.01); *G06F 1/1616* (2013.01); *G06F 1/1637* (2013.01);
  (Continued)

(58) Field of Classification Search
  CPC ......... G06F 1/1652; G06F 2203/04102; G06F 2203/04107; G06F 3/0412; G06F 1/1616;
  (Continued)

(56) References Cited

U.S. PATENT DOCUMENTS

| | | | |
|---|---|---|---|
| 9,423,891 B2 * | 8/2016 | Kelso | G06F 1/1616 |
| 10,054,466 B2 | 8/2018 | Matsumoto | |

(Continued)

FOREIGN PATENT DOCUMENTS

| | | |
|---|---|---|
| JP | 2015-26235 A | 2/2015 |
| JP | 2017-510065 A | 4/2017 |
| WO | 2020/0211085 A1 | 10/2020 |

OTHER PUBLICATIONS

Extended European Search Report, mailed Sep. 27, 2022, for European Application No. 20867607.2-1224 / 4016260, 9 pages.

(Continued)

*Primary Examiner* — Dismery Mercedes
(74) *Attorney, Agent, or Firm* — Seed Intellectual Property Law Group LLP

(57) ABSTRACT

A foldable position detection sensor operable by electromagnetic induction coupling is configured to alleviate the problem of the levels of electromagnetic coupling with an electronic pen locally changing at a bending portion of the sensor. The position detection sensor includes a digitizer that includes an electrode configured to couple with a position indicator by electromagnetic induction coupling. The position detection sensor includes multiple electromagnetic sheets disposed to cover a surface of the digitizer opposite to an input surface thereof for receiving input form the position indicator. The multiple electromagnetic sheets are spaced apart from one another along the surface of the digitizer at a bending location where the digitizer is bent. The electromagnetic sheets are configured such that when the digitizer is in an unfolded state the electromagnetic sheets overlap with one another at the bending location in a direction perpendicular to the input surface of the digitizer.

18 Claims, 10 Drawing Sheets

Related U.S. Application Data continuation of application No. PCT/JP2020/036606, filed on Sep. 28, 2020.

(51) Int. Cl.
  *G06F 3/044* (2006.01)
  *G06F 3/046* (2006.01)

(52) U.S. Cl.
  CPC .......... *G06F 1/1641* (2013.01); *G06F 1/1643* (2013.01); *G06F 1/1652* (2013.01); *G06F 1/1656* (2013.01); *G06F 1/1681* (2013.01); *G06F 3/0412* (2013.01); *G06F 3/0447* (2019.05); *G06F 2203/04102* (2013.01); *G06F 2203/04107* (2013.01)

(58) Field of Classification Search
  CPC ...... G06F 3/046; G06F 1/1656; G06F 1/1643; G06F 1/1641; G06F 1/1618; G09G 2330/04; G09G 2330/06
  See application file for complete search history.

(56) References Cited

U.S. PATENT DOCUMENTS

| | | | | |
|---|---|---|---|---|
| 11,307,613 | B2 * | 4/2022 | Yu | G06F 1/1681 |
| 2011/0006759 | A1 * | 1/2011 | Fukushima | G06F 3/046 |
| | | | | 324/207.15 |
| 2012/0243207 | A1 | 9/2012 | Wang et al. | |
| 2012/0306824 | A1 | 12/2012 | Horie | |
| 2013/0021762 | A1 | 1/2013 | van Dijk et al. | |
| 2014/0111954 | A1 | 4/2014 | Lee et al. | |
| 2017/0177123 | A1 | 6/2017 | Kobori et al. | |
| 2017/0364123 | A1 | 12/2017 | Seo et al. | |
| 2018/0081395 | A1 * | 3/2018 | Huang | G06F 1/1616 |
| 2018/0103553 | A1 * | 4/2018 | Kim | H05K 9/0054 |
| 2018/0107250 | A1 * | 4/2018 | Cho | G06F 1/1652 |
| 2018/0206330 | A1 | 7/2018 | Cao et al. | |
| 2020/0236826 | A1 * | 7/2020 | Baek | G06F 1/1681 |
| 2020/0364021 | A1 | 11/2020 | Park et al. | |
| 2020/0401275 | A1 | 12/2020 | Shin et al. | |
| 2021/0026406 | A1 * | 1/2021 | Kim | G06F 1/1656 |
| 2021/0233987 | A1 * | 7/2021 | Zhang | H10K 59/8722 |
| 2022/0043481 | A1 * | 2/2022 | Shin | G06F 1/1652 |
| 2022/0075413 | A1 | 3/2022 | Park et al. | |

OTHER PUBLICATIONS

International Search Report, mailed Dec. 8, 2020, for International Application No. PCT/JP2020/036606, 2 pages.

* cited by examiner

B-B SECTIONAL VIEW

A-A SECTIONAL VIEW

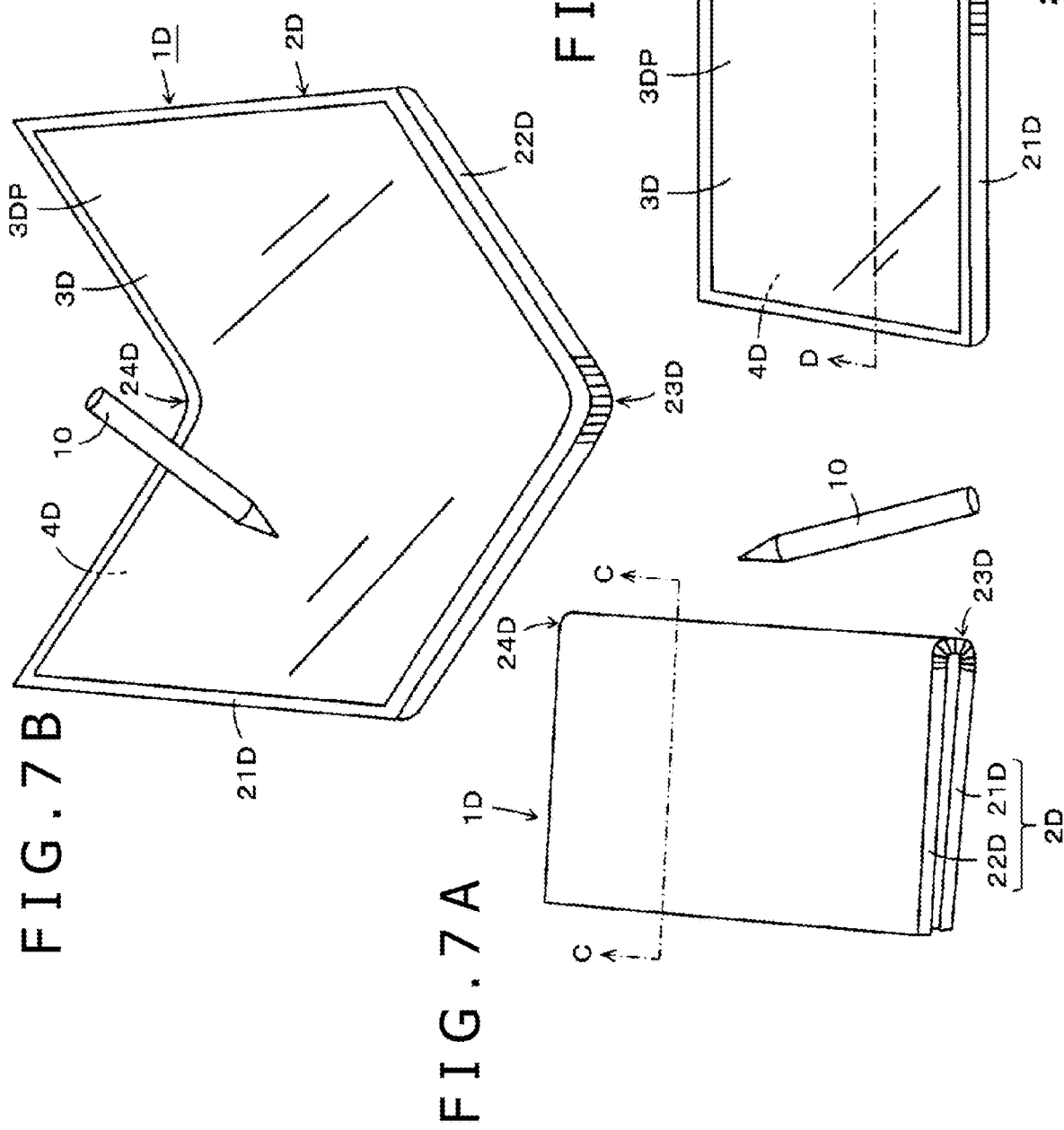

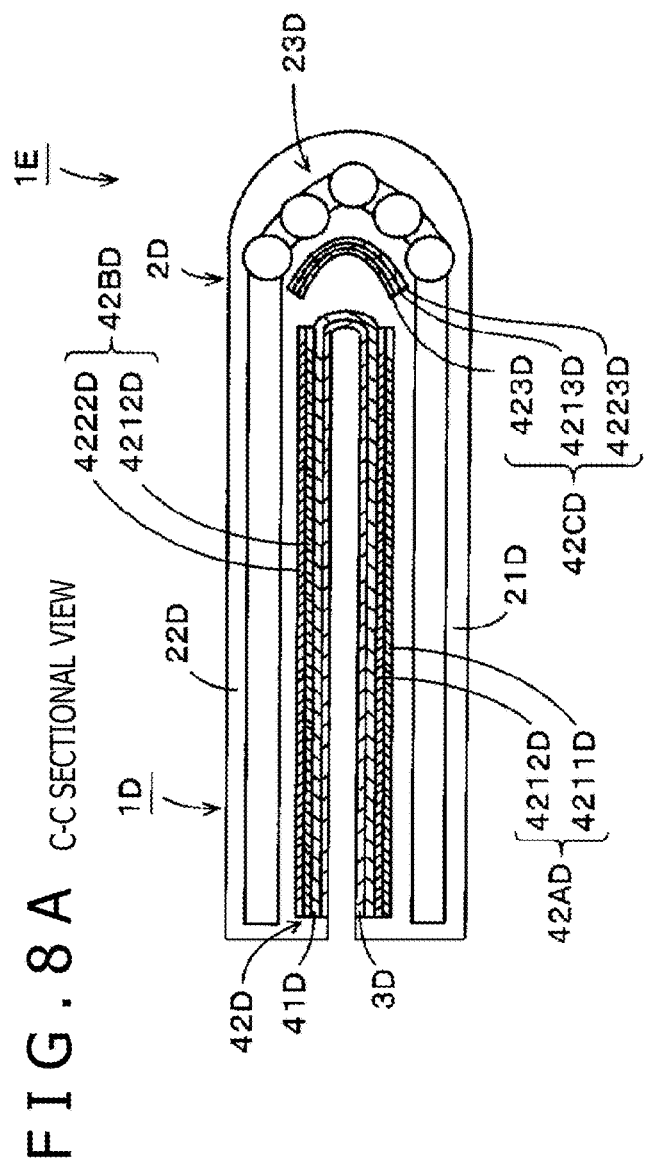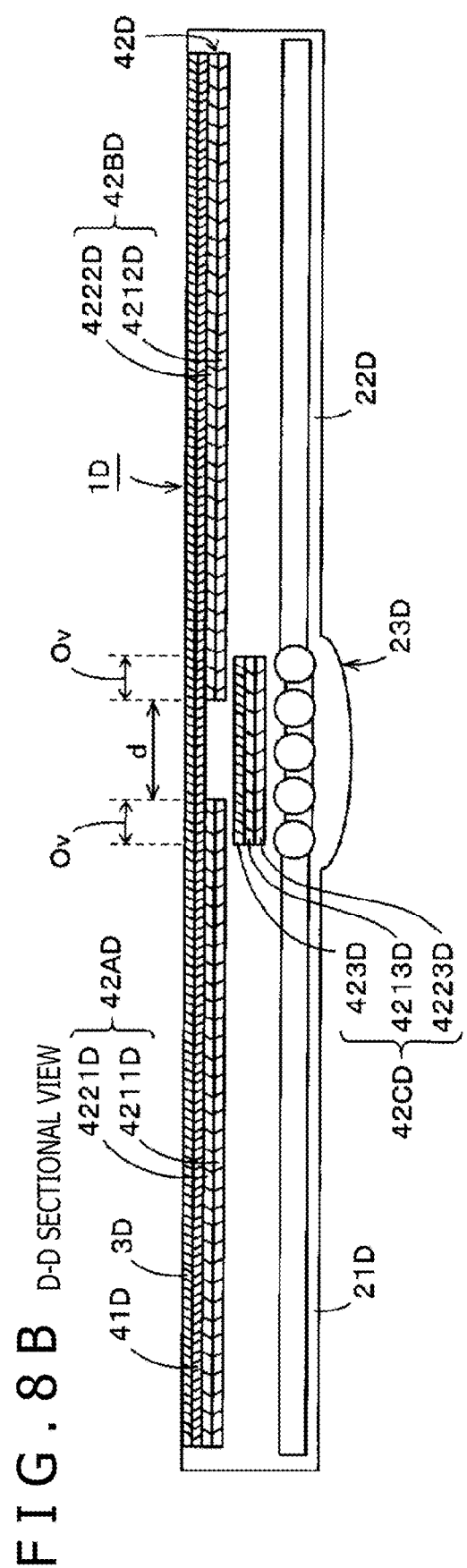
FIG. 8A C-C SECTIONAL VIEW
FIG. 8B D-D SECTIONAL VIEW

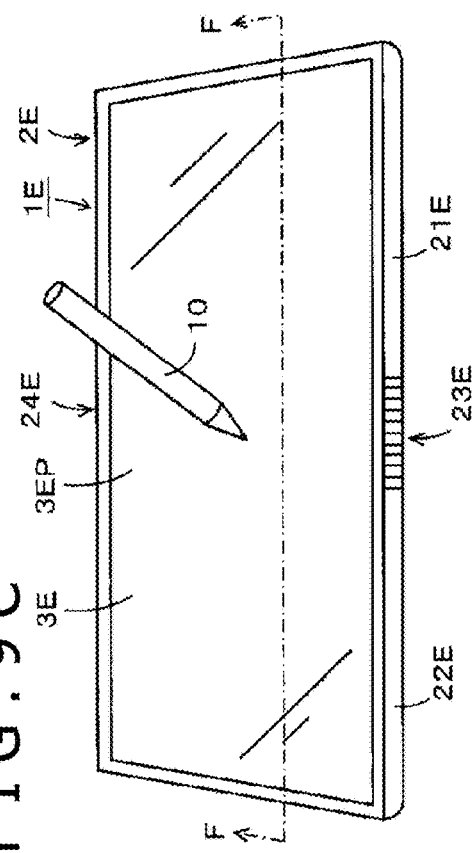
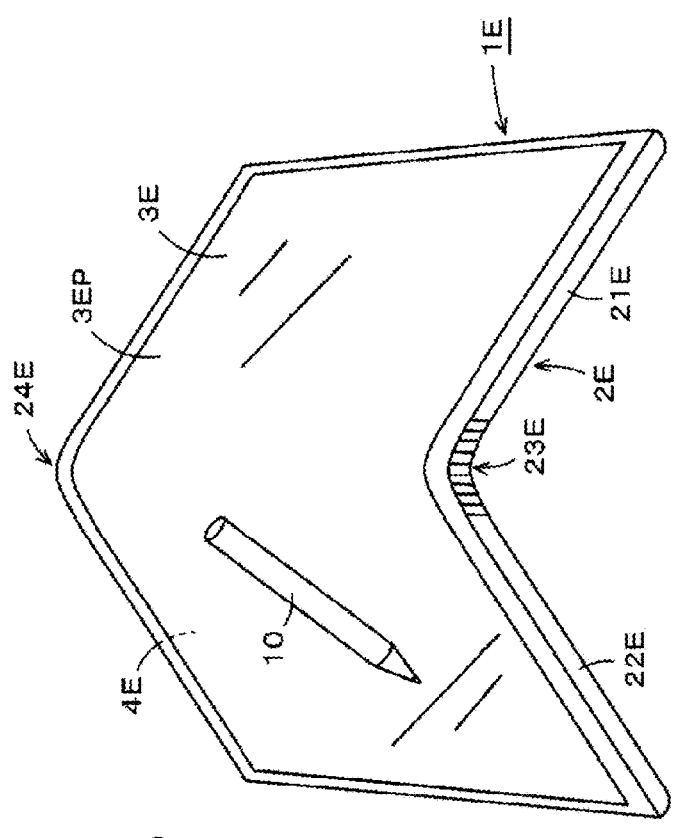
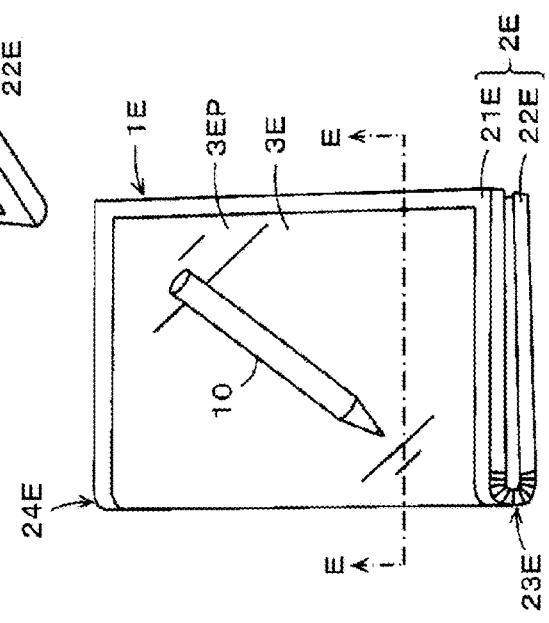
FIG. 9A
FIG. 9B
FIG. 9C

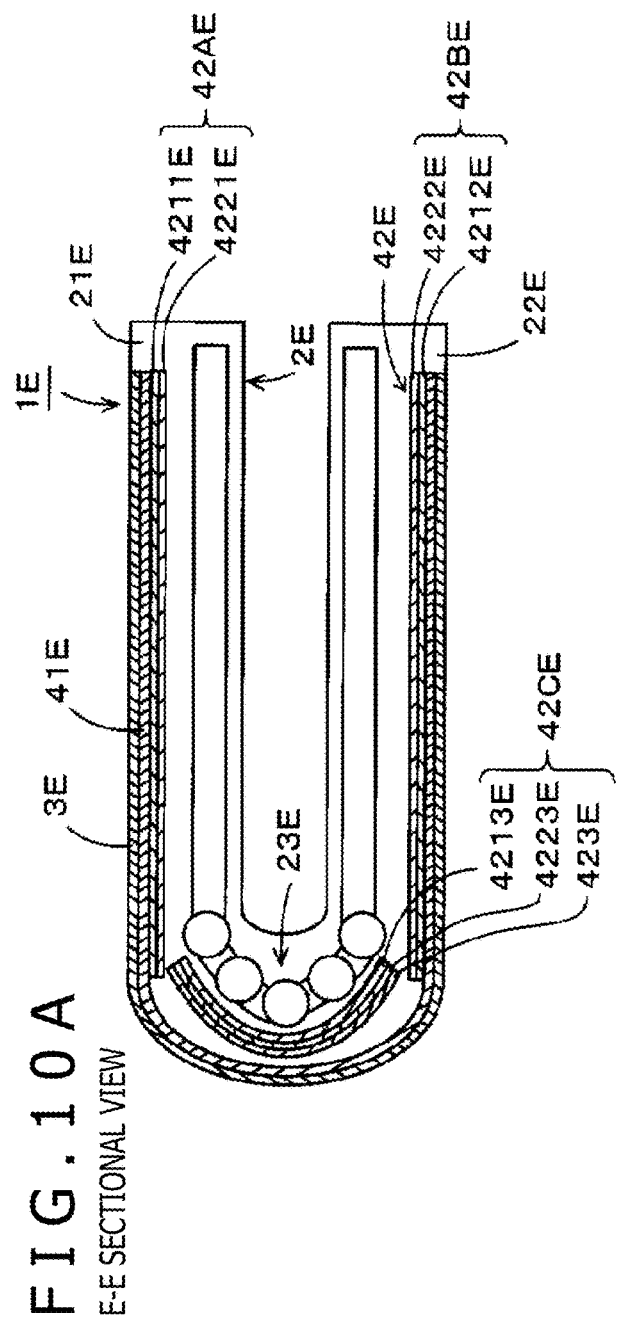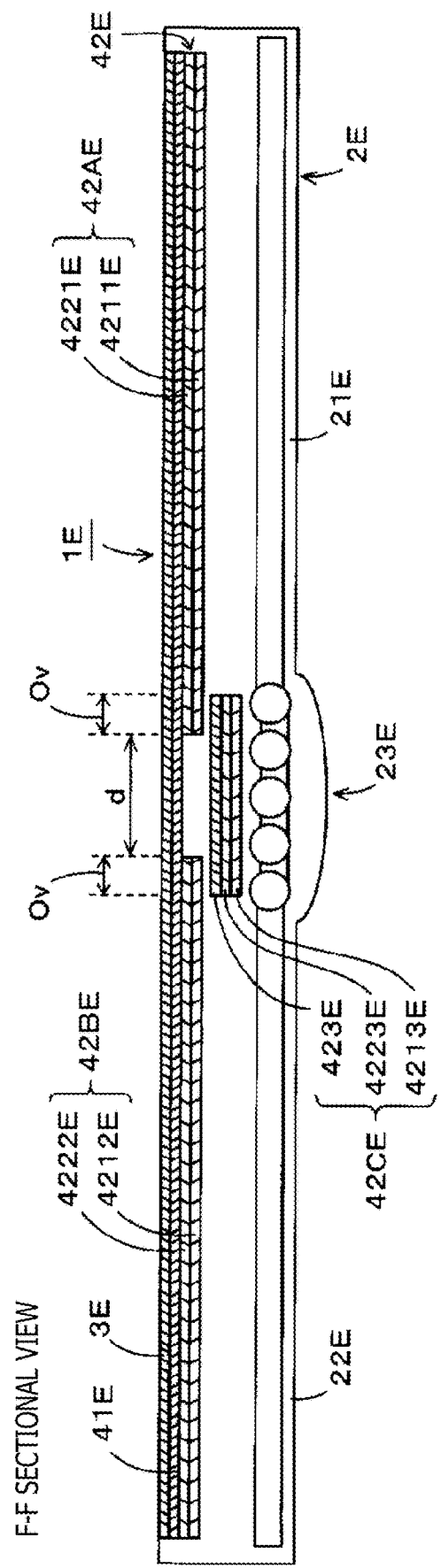

POSITION DETECTION SENSOR AND INPUT APPARATUS

BACKGROUND

Technical Field

The present disclosure relates to a bendable (foldable) position detection sensor and input apparatus in compliance with an electromagnetic induction coupling system.

Description of the Related Art

Mobile devices such as mobile telephone terminals and mobile computers are equipped with a display element having a display screen that displays text characters and images. In recent years, the display screen has increased in size. An enlarged display screen, however, increases the size of the mobile devices to possibly hinder their portability.

In view of this, mobile devices in a foldable casing using a bendable flexible display element have been proposed. The proposed mobile devices are equipped with a large display screen while being kept small in size (e.g., see Patent Document 1 (JP-T-2017-510065)).

Meanwhile, some mobile devices commercialized in recent years serve as input apparatuses that receive input operations from users. Such a mobile device has a position detection sensor overlaid on its display screen. The position detection sensor detects the positions indicated by an electronic pen held by the user, thereby receiving various input operations through the display screen. In this case, either a position detection sensor operable by capacitive coupling or a position detection sensor operable by electromagnetic induction coupling can be used. In cases where a fine position indication is desired, a position detection sensor operable by electromagnetic induction coupling is used (e.g., see Patent Document 2 (JP 2015-26235A)).

FIG. 11 is a partial sectional view of a mobile device having a position detection sensor that is overlaid on a display element and that operates by electromagnetic induction coupling.

In this example, as depicted in FIG. 11, a display element 102 is disposed on an upper side of a casing 101 of the mobile device. A position detection sensor 103 is overlaid on one side of the display element 102 (on the back side of the display element 102) opposite to the side where a display screen 102D of the display element 102 is provided. The position detection sensor 103 includes a digitizer part 104 and an electromagnetic sheet part 105, as depicted in FIG. 11.

The digitizer part 104 has multiple loop coils, which are not depicted, arranged in the horizontal direction (X direction) and vertical direction (Y direction) of the display screen 102D on a substrate.

The electromagnetic sheet part 105 is disposed so as to cover the entire surface of the digitizer part 104 that is opposite to a surface facing the display element 102. The electromagnetic sheet part 105 is known as a magnetic path plate and includes a first layer 1051 constituting a magnetic path material and a second layer 1052 used for providing magnetic shielding.

The first layer (magnetic path material layer) 1051 constituting the magnetic path material forms a magnetic path in an alternating magnetic field generated by the loop coils of the digitizer part 104 relative to electromagnetic waves exchanged with an electronic pen operable by electromagnetic induction coupling. In this manner, the first layer 1051 prevents divergence of magnetic flux and thus improves the detection sensitivity, relative to the electronic pen, of the position detection sensor 103 operable by electromagnetic induction coupling. Further, the second layer (electromagnetic shield layer) 1052 used for providing electromagnetic shielding performs the function of preventing alternating magnetic fields from radiating out of the underside of the position detection sensor 103 (opposite to the side where the display screen 102D is provided) operable by electromagnetic induction coupling. The second layer 1052 further prevents electromagnetic waves emitted from out of the underside from interfering as noise with the electromagnetic waves exchanged with the electronic pen.

As the first layer 1051, a magnetic material with high magnetic permeability is used. The second layer 1052 is formed of a metallic material that is highly conductive non-magnetic material, such as an aluminum-based metallic sheet.

PRIOR ART DOCUMENT

Patent Documents

Patent Document 1: JP-T-2017-510065
Patent Document 2: JP 2015-26235A

SUMMARY

Technical Problems

The above-described position detection sensor 103 operable by electromagnetic induction coupling is made bendable by using a flexible substrate as the substrate of the digitizer part 104. It follows that combining the flexible display element such as one disclosed in Patent Document 1 with a bendable position detection sensor will conceivably provide a foldable mobile device equipped with an input apparatus that can receive a position indication from the electronic pen.

In the mobile device equipped with the above type of input apparatus, when a casing is in a fully unfolded state following a folded state, an entire surface on one side of the casing serves as the display screen of a flexible display element, to provide a display screen twice as large as that in its folded state. Also, the mobile device can use a region corresponding to the display screen as a detection region and detect a position indicated by the electronic pen over the detection region.

However, in the case where the mobile device is configured to be foldable as described above, we have found the following problems may arise.

The above-described mobile device is folded and unfolded frequently in use. As a result, it has been determined that a bending portion 103a of the position detection sensor 103 deteriorates due to the frequent repetition of the folding and unfolding operations, as depicted in FIG. 12. In particular, it has been determined that the metallic sheet portion of the second layer 1052 in the electromagnetic sheet part 105 deteriorates seriously.

It has been further determined that the level of electromagnetic coupling energy between the position detection sensor 103 and the electronic pen changes locally at the bending portion 103a subject to such deterioration.

FIG. 13 is a characteristic diagram indicative of the levels of electromagnetic coupling between an electronic pen and multiple loop coils in the X direction of the position detection sensor 103. As depicted in FIG. 13, in a case where there is no deterioration in the bending portion of the position detection sensor 103 depicted in FIG. 12, a substantially constant level of electromagnetic coupling occurs between the electronic pen and the multiple loop coils in the X direction, as indicated by a characteristic curve 108a of an alternately long and short dash line.

On the other hand, it has been determined that, in a case where there is deterioration in the bending portion 103a of the position detection sensor 103 depicted in FIG. 12, the level of electromagnetic coupling between the electronic pen and the loop coils in the X direction in the region of the bending portion 103a of the position detection sensor 103 changes (varies) locally, as compared with the loop coils in the X direction in the remaining positions, as indicated by a characteristic curve 108b of a solid line.

An aspect of the present disclosure is to provide a position detection sensor and input apparatus that can solve the above-mentioned problems.

Technical Solution

In order to solve the above problems, a position detection sensor is provided that includes a digitizer including an electrode configured to be coupled with a position indicator by electromagnetic induction coupling, and multiple electromagnetic sheets disposed to cover a surface of the digitizer opposite to an input surface thereof for receiving input from the position indicator. The multiple electromagnetic sheets are spaced apart from one another along the surface of the digitizer at a bending location where the digitizer is bent. The electromagnetic sheets are configured such that, when the digitizer is in an unfolded state, they overlap with one another at the bending location in a direction perpendicular to the input surface of the digitizer.

There is also provided an input apparatus including a position detection sensor operable by electromagnetic induction coupling and an external casing member including a hinge part that allows the position detection sensor to transition between a folded state and an unfolded state. The position detection sensor includes multiple electromagnetic sheets disposed so as to cover a surface of the digitizer opposite to an input surface thereof for receiving input from the position indicator. The multiple electromagnetic sheets are spaced apart from one another along the surface of the digitizer at a bending location where the digitizer is bent. The electromagnetic sheets are configured such that, when the digitizer is in an unfolded state, they overlap one another at the bending location in a direction perpendicular to the input surface of the digitizer.

In the position detection sensor configured as described above and in the input apparatus having the position detection sensor, the electromagnetic sheet is divided into multiple magnetic sheets that are spaced apart from one another at the bending location, so as to reduce bending stress caused by folding at the bending portion to thereby alleviate deterioration due to repeated folding and unfolding.

Further, even though the electromagnetic sheet is divided into the multiple magnetic sheets, when the digitizer is in the unfolded state in which the position detection sensor is usable, the multiple divided electromagnetic sheets overlap with one another at the bending location. This ensures electromagnetic shielding even where the electromagnetic sheets are separated from one another to thereby prevent the level of electromagnetic coupling with an electronic pen from changing locally at the bending portion.

BRIEF DESCRIPTION OF THE SEVERAL VIEWS OF THE DRAWINGS

FIGS. 7A, 7B and 7C are drawings illustrating another example of a mobile device equipped with the input apparatus according to the embodiment of the present disclosure.

FIGS. 8A and 8B are drawings illustrating a configuration example of a main portion of the mobile device of the example in FIG. 7.

FIGS. 9A, 9B and 9C are drawings illustrating a position detection sensor according to another embodiment of the present disclosure.

FIGS. 10A and 10 B are drawings illustrating a configuration example of a main portion of the mobile device of the example in FIG. 9.

DETAILED DESCRIPTION

Described below with reference to the accompanying drawings are several embodiments of a position detection sensor according to the present disclosure, together with embodiments of an input apparatus that uses the position detection sensor that embodies the disclosure. The following description relates to cases where the functions of an embodiment of the input apparatus are incorporated in a mobile device configured to be foldable using a flexible display element.

Figure 1:
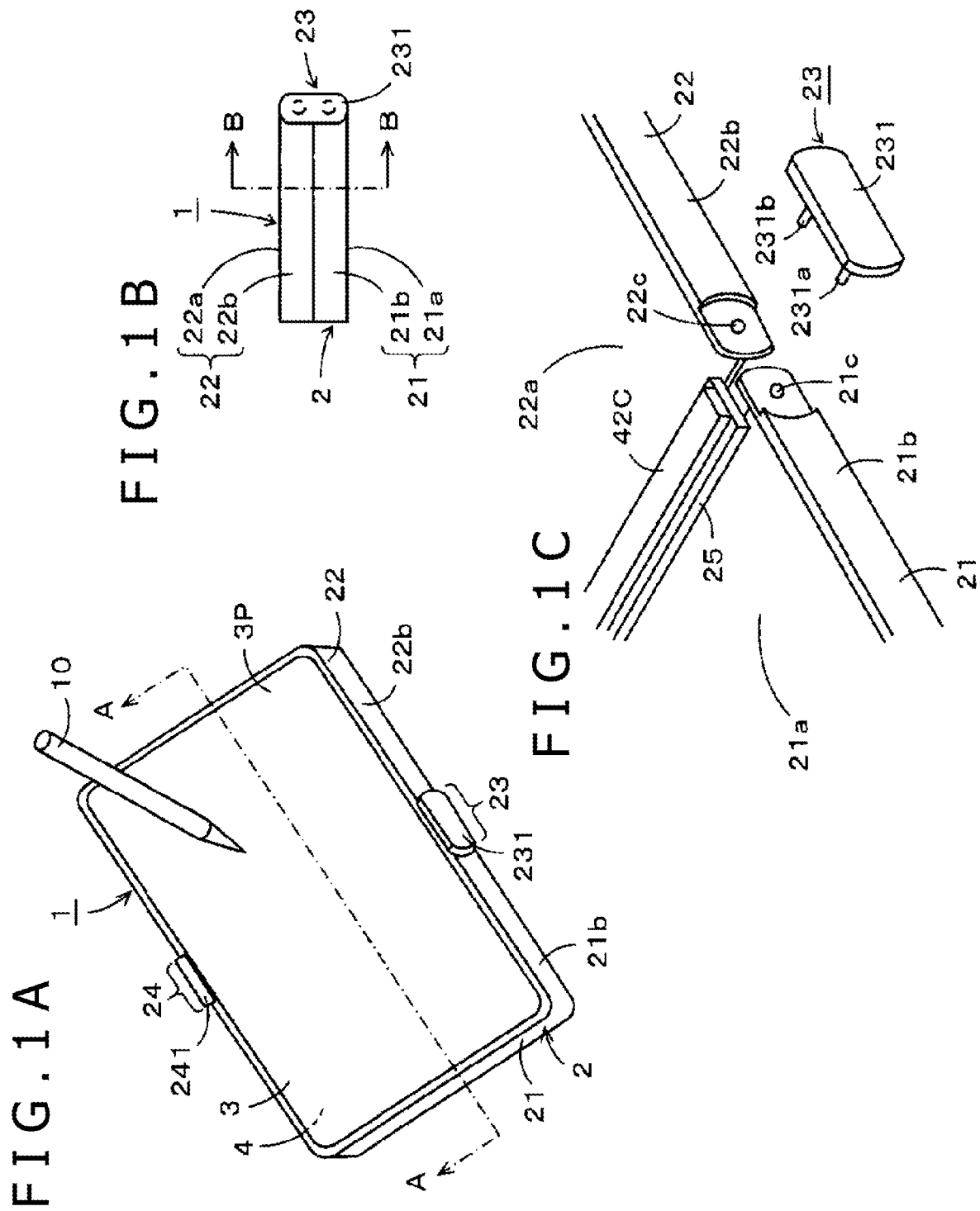
FIGS. 1A, 1B and 1C are drawings illustrating a configuration example of a mobile device equipped with an input apparatus according to an embodiment of the present disclosure.

FIGS. 1A-1C are drawings illustrating a configuration of a mobile device incorporating the functions of an input apparatus embodying the present disclosure. A mobile device 1 of this example is equipped with a flexible display element and includes the functions of an input apparatus that uses a foldable position detection sensor operable by electromagnetic induction coupling. It is to be noted that the mobile device 1 of the example of FIGS. 1A-1C is configured to be foldable toward the display screen side of the flexible display element (to be valley folded).

FIG. 1A depicts the mobile device 1 of this example as it is fully unfolded. FIG. 1B depicts the mobile device 1 as it is folded. FIG. 1C depicts a typical hinge structure that enables the mobile device 1 of this example to be folded. In the unfolded state of the mobile device 1 as depicted in FIG.

1A, a display screen 3P of a flexible display element 3 is exposed. When a position on the display screen 3P is indicated by an electronic pen 10 operable by electromagnetic induction coupling, the position indicated by the electronic pen 10 is detected by a position detection sensor 4 that is located on the underside (back side) of the screen and that operates by electromagnetic induction coupling.

In the embodiment, the display region of the display screen 3P is substantially the same as the position detection region of the position detection sensor 4. The display screen 3P serves as an input surface for a position indication by the electronic pen 10. The positions indicated by the electronic pen 10 over the entire input surface are detected by the position detection sensor 4.

An external casing (housing) 2 of the mobile device 1 of this example is structured such that a first frame member 21 and a second frame member 22 are foldably coupled with each other at hinge parts 23 and 24.

As depicted in FIGS. 1A-1C, the first frame member 21 has a wall part 21b formed around a bottom part 21a, and the second frame member 22 has a wall part 22b formed around a bottom part 22a, so as to form a flat recessed part that accommodates the flexible display element 3, the position detection sensor 4, and an electronic circuit part (not depicted) connected therewith. It is to be noted that the wall part 21b is not formed (e.g., cut out) along the edges of the bottom parts 21a and 22a of the first and second frame members 21 and 22 between the hinge parts 23 and 24.

As a result, in the folded state in FIG. 1B, an opening is created between the hinge parts 23 and 24, and dust may possibly enter through the opening. Thus, in the embodiment, a protection plate 25 (see FIG. 1C) is arranged in the portion between the hinge parts 23 and 24.

Along the sides of the bottom parts 21a and 22a of the first and second frame members 21 and 22 that are facing each other between the hinge parts 23 and 24, there are provided coupling holding parts (depicted in FIGS. 3 and 4 but not in FIG. 1) to allow the protection plate 25 to rotatably couple the first and second frame members 21 and 22 when they are folded.

At the hinge parts 23 and 24 of the mobile device 1 of this example, the first and second frame members 21 and 22 have a dual-axis hinge structure in which each of the frame members can rotate about a different rotation axis position. Since the hinge parts 23 and 24 are similarly configured, the structure of the hinge part 23 alone is explained below, and the description of the hinge part 24 is omitted.

Specifically, at an end portion of the wall part 21b of the first frame member 21 where the hinge part 23 is disposed, a through-hole 21c is formed to receive a pivot shaft as depicted in FIG. 1C. Likewise, at an end portion of the wall part 22b of the second frame member 22 where the hinge part 23 is disposed, a through-hole 22c is formed to receive a pivot shaft as depicted in FIG. 1C.

There is further provided a hinge forming plate 231 having pins 231a and 231b for insertion in the through-holes 21c and 22c. In this case, the diameters of the pins 231a and 231b are made smaller than those of the through-holes 21c and 22c. When the pins 231a and 231b of the hinge forming plate 231 are inserted respectively in the through-hole 21c of the wall part 21b of the first frame member 21 and the through-hole 22c of the wall part 22b of the second frame member 22, the hinge forming plate 231 allows the first and second frame members 21 and 22 to be rotatably coupled with each other at the hinge part 23. In this case, although not depicted, the tips of the pins 231a and 231b inserted in the through-holes 21c and 22c are fitted with detachment prevention members to keep the hinge forming plate 231 from getting detached.

The hinge part 24 has a similar structure. A hinge forming plate 241 is attached so as to rotatably couple the first and second frame members 21 and 22 with each other at the hinge part 24.

In the manner described above, the mobile device 1 of the embodiment has the first and second frame members 21 and 22 rotatably coupled with each other at the hinge parts 23 and 24. This enables the external casing 2 to be folded as depicted in FIG. 1B.

[Configuration Examples of the Flexible Display Element 3 and the Position Detection Sensor 4]

Figure 2:
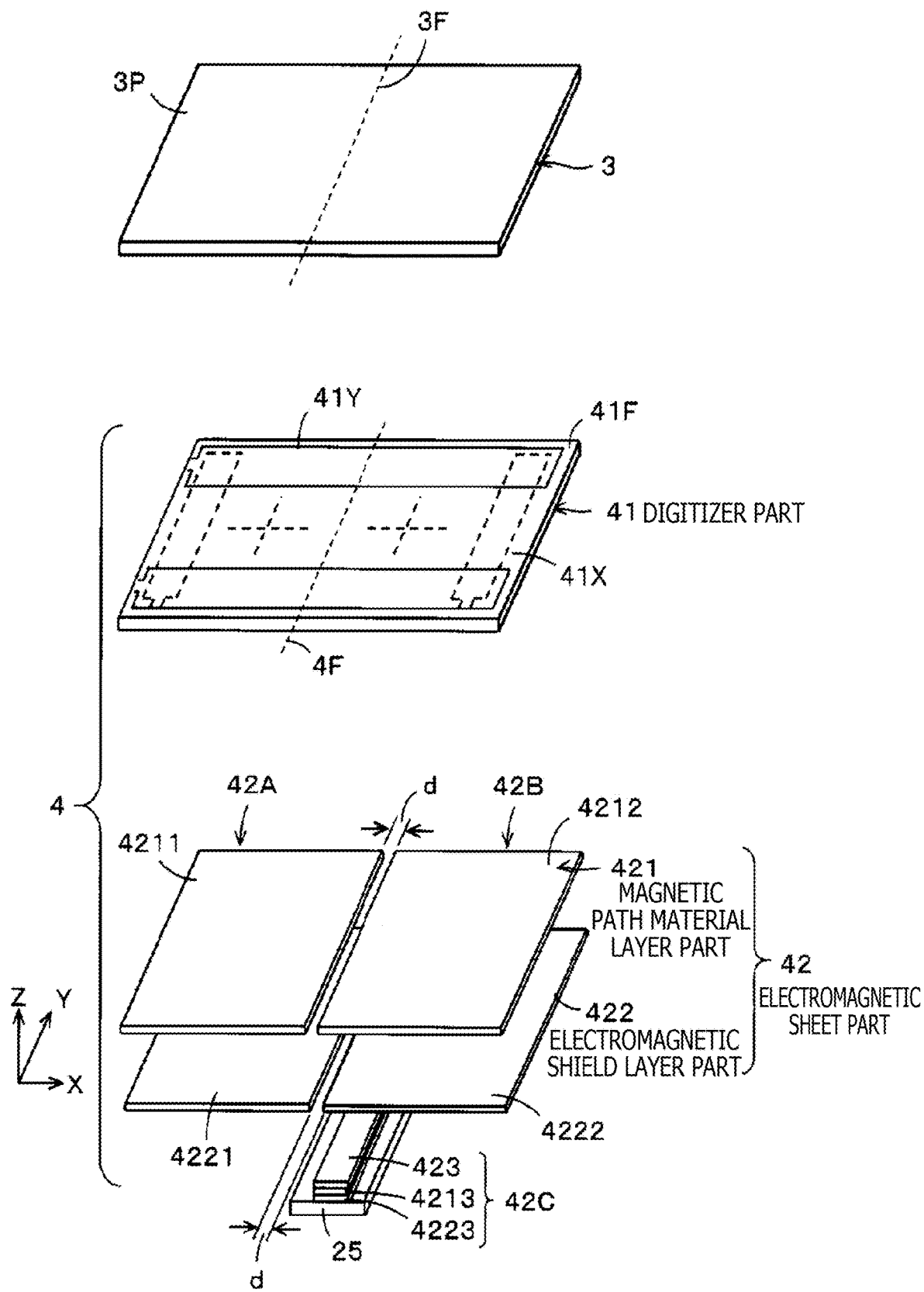
FIG. 2 is an exploded perspective view of a configuration example of the input apparatus according to the embodiment of the present disclosure.

As discussed above, the external casing 2 houses the flexible display element 3, the position detection sensor 4, and the electronic circuit part connected therewith. FIG. 2 is an exploded perspective view for describing the flexible display element 3 and the position detection sensor 4.

The flexible display element 3 includes an organic EL (Electroluminescence) display element or an LCD (Liquid Crystal Display), for example. The flexible display element 3 has the display screen 3P with multiple display pixels arranged in the X-axis direction (horizontal direction) and Y-axis direction (vertical direction).

The position detection sensor 4, which is operable by electromagnetic induction coupling, is arranged on the underside of the flexible display element 3 (opposite to the side where the display screen 3P is provided) so as to be overlaid on the flexible display element 3.

The position detection sensor 4 includes a digitizer part 41 and an electromagnetic sheet part 42. The digitizer part 41 includes multiple loop coils 41X arranged in the X-axis direction and multiple loop coils 41Y arranged in the Y-axis direction on a flexible substrate 41F. In the example of FIG. 2, the multiple loop coils 41Y are arranged on an upper surface of the flexible substrate 41F, and the multiple loop coils 41X are arranged on an under surface of the flexible substrate 41F. The digitizer part 41 is attached, for example, on a surface of the flexible display element 3 opposite to the display screen 3P.

In this example, as discussed above, the display region on the display screen 3P of the flexible display element 3 is substantially the same in size as the position detection region of the digitizer part 41 of the position detection sensor 4. The digitizer part 41 uses the display screen 3P of the flexible display element 3 as an input surface for a position indication by the electronic pen 10. The digitizer part 41 thus detects those positions on the input surface indicated by the electronic pen 10.

An electromagnetic sheet part 42 is attached, for example, on a surface of the digitizer part 41 opposite to a surface (input surface) on which the flexible display element 3 is attached.

In the embodiment, the electromagnetic sheet part 42 includes a magnetic path material layer part 421 and an electromagnetic shield layer part 422 stacked on top of each other. The magnetic path material layer part 421 forms a magnetic path in an alternating magnetic field generated by the loop coils 41X and 41Y of the digitizer part 41 relative to electromagnetic waves exchanged with the electronic pen 10. In this manner, the magnetic path material layer part 421 prevents divergence of generated magnetic flux and thus improves the detection sensitivity, relative to the electronic pen 10, of the position detection sensor 4 operable by electromagnetic induction coupling. Further, the electromagnetic shield layer part 422 performs the function of preventing alternating magnetic fields from radiating out to the electronic circuit part on the underside of the position detection sensor 4 operable by electromagnetic induction coupling. The electromagnetic shield layer part 422 further prevents electromagnetic waves emitted from the electronic circuit part on the underside from interfering as noise with the electromagnetic waves exchanged with the electronic pen 10.

The magnetic path material layer part 421 includes a magnetic material having high magnetic permeability. In this example, the magnetic path material layer part 421 is formed by mixing a magnetic material powder of high magnetic permeability, such as an amorphous alloy powder, with a non-magnetic, non-conductive, high-polymer material such as a plastic resin. The electromagnetic shield layer part 422 includes a metallic material that is highly conductive non-magnetic material, such as an aluminum-based metallic sheet in this example.

In the embodiment, the electromagnetic sheet part 42 is configured, as will be described below, in order to mitigate the problems stemming from the flexible display element 3 and digitizer part 41 being foldable when bent at a bending location indicated by broken lines 3F and 4F in FIG. 2.

Specifically, the electromagnetic sheet part 42 does not cover the entire surface of the digitizer part 41 and is divided into a first sheet portion 42A and a second sheet portion 42B that are spaced from each other by a predetermined distance d at the bending location and that are attached to the digitizer part 41. The electromagnetic sheet part 42 further includes a third sheet portion 42C covering the predetermined distance d between the first and second sheet portions 42A and 42B. That is, in the embodiment, the electromagnetic sheet part 42 is divided into three portions: the first sheet portion 42A, the second sheet portion 42B, and the third sheet portion 42C.

In FIG. 2, the first sheet portion 42A includes a first portion 4211 of the magnetic path material layer part 421 and a first portion 4221 of the electromagnetic shield layer part 422 that are located on the left of the bending location. Further, in FIG. 2, the second sheet portion 42B includes a second portion 4212 of the magnetic path material layer part 421 and a second portion 4222 of the electromagnetic shield layer part 422 that are located on the right of the bending location.

The third sheet portion 42C includes a magnetic path material layer part 4213, an electromagnetic shield layer part 4223, and a spacer member 423. The magnetic path material layer part 4213 having a width wider than the predetermined distance d at the bending location is attached to the electromagnetic shield layer part 4223. The spacer member 423 is made of a plastic resin and is attached to the magnetic path material layer part 4213.

In the embodiment, the first sheet portion 42A and the second sheet portion 42B are spaced from each other by the predetermined distance d when being attached to the digitizer part 41. In this case, the first portion 4211 and the second portion 4212 of the magnetic path material layer part 421 spaced from each other by the predetermined distance d are attached, for example, on the surface of the digitizer part 41 opposite to the input surface thereof. Thereafter, the first portion 4221 and the second portion 4222 of the electromagnetic shield layer part 422 spaced from each other by the predetermined distance d are attached to the first portion 4211 and the second portion 4212 of the magnetic path material layer part 421, respectively.

In this case, the predetermined distance d may preferably be a length corresponding to the portion at which the digitizer part 41 is bent into a curve when the external casing is folded. The distance d is approximately 3 to 5 mm in this example. Here, the predetermined distance d need not be a length that would produce no bending curve on the first and second sheet portions 42A and 42B. Instead, the predetermined distance d need only be long enough to alleviate the bending stress caused by bending of the first and second sheet portions 42A and 42B. There may be a curved surface near the predetermined distance d between the first and second sheet portions 42A and 42B that are bent.

The third sheet portion 42C in the embodiment is provided apart from, and not in contact with, the digitizer part 41 and the first and second sheet portions 42A and 42B of the electromagnetic sheet part 42. In the embodiment, the third sheet portion 42C is attached to the protection plate 25 (on a surface of the protection plate 25 facing the electromagnetic sheet part 42) between the hinge parts 23 and 24 (see FIG. 1C).

Figure 3:
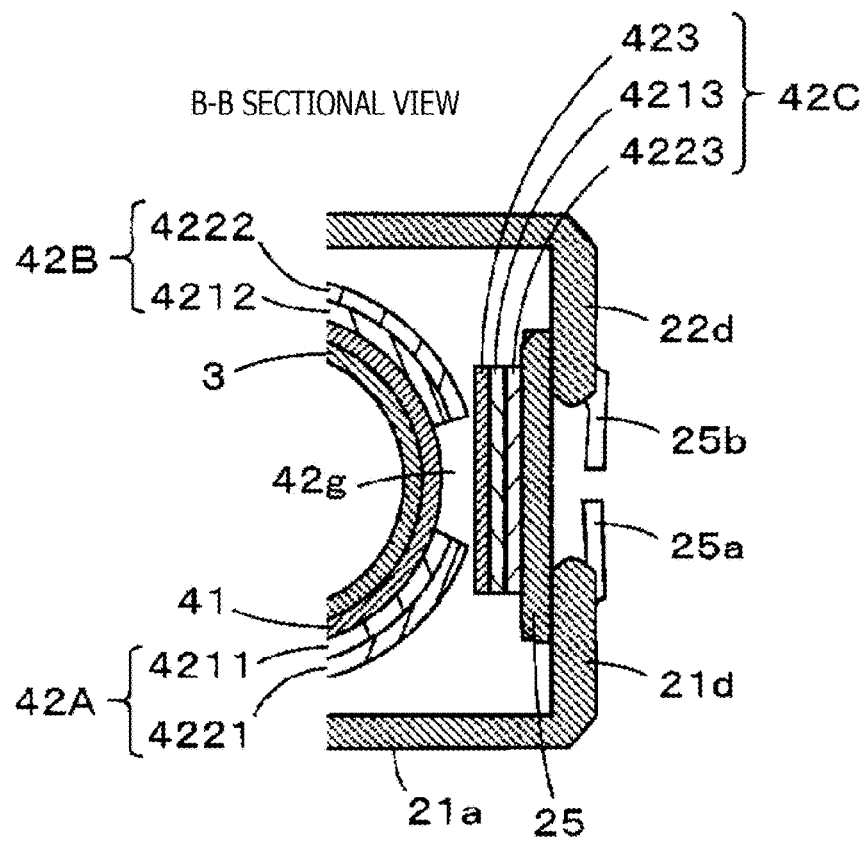
FIG. 3 is a drawing illustrating a configuration example of a main portion of the input apparatus according to the embodiment of the present disclosure.
Figure 4:
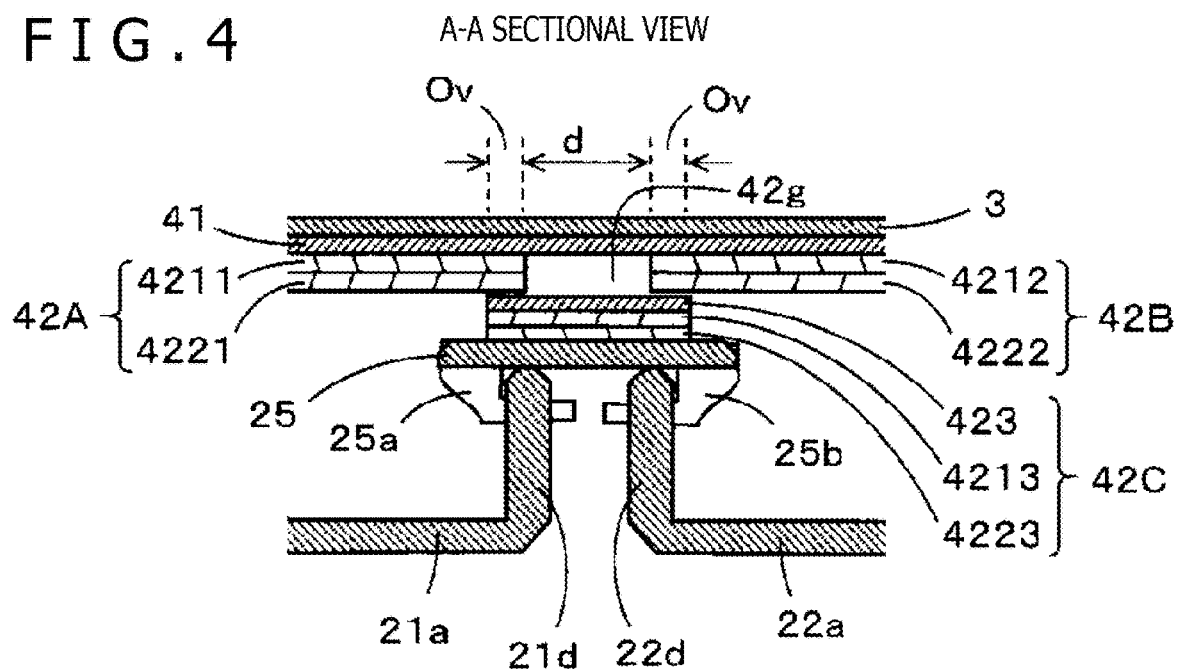
FIG. 4 is another drawing illustrating a configuration example of a main portion of the input apparatus according to the embodiment of the present disclosure.

Explained below with reference to the sectional views of FIGS. 3 and 4 is a configuration around the bending location of the mobile device 1 including the electromagnetic sheet part 42. FIG. 3 is a sectional view taken along line B-B in FIG. 1B depicting the mobile device 1 in its folded state. FIG. 4 is a sectional view taken along line A-A in FIG. 1A depicting the mobile device 1 in its fully unfolded state.

As depicted in FIGS. 3 and 4, in the mobile device 1 of the embodiment, coupling holding parts 21d and 22d are provided along an edge of the bottom part 21a of the first frame member 21 between the hinge parts 23 and 24 and along an edge of the bottom part 22a of the second frame member 22 between the hinge parts 23 and 24. The coupling holding parts 21d and 22d allow the protection plate 25 provided between the hinge parts 23 and 24, to rotatably couple the first and second frame members 21 and 22 with each other as described above during folding and unfolding of the input apparatus.

Meanwhile, the protection plate 25 has claw parts 25a and 25b for rotatably coupling the coupling holding parts 21d and 22d, as depicted in FIGS. 3 and 4. It is to be noted that, although not depicted, the claw parts 25a and 25b are provided at two or more locations between the hinge parts 23 and 24.

Further, the third sheet portion 42C of the electromagnetic sheet part 42 is provided on an upper surface of the protection plate 25 that is facing the flexible display element 3 and the position detection sensor 4, as depicted in FIGS. 3 and 4. In this case, as depicted in FIGS. 3 and 4, the third sheet portion 42C is disposed on the protection plate 25 in such a manner as to cover a gap 42g between the first sheet portion 42A and the second sheet portion 42B spaced from each other by the predetermined distance d at the bending location.

Also, in this case, although the third sheet portion 42C may be in contact with the first and second sheet portions 42A and 42B, in this example, the third sheet portion 42C is configured to be not in contact with the first and second sheet portions 42A and 42B both in the folded state of FIG. 3 and in the fully unfolded state of FIG. 4. In this example, the third sheet portion 42C is spaced from the first and second sheet portions 42A and 42B in a direction perpendicular to the input surface of the digitizer part 41, so that the third sheet portion 42C is not in electrical or physical contact with the first and second sheet portions 42A and 42B. In this case, only a small clearance (that is referred to as "sheet thickness direction clearance") need to be provided between the third sheet portion 42C and the first and second sheet portions 42A and 42B in the direction perpendicular to the input surface of the digitizer part 41. In the fully unfolded state in FIG. 4, for example, the sheet thickness direction clearance may be approximately 0.1 mm.

In the embodiment, in particular, the width of the third sheet portion 42C (i.e., the length perpendicular to the direction connecting the hinge part 23 with the hinge part 24) is made larger than the predetermined distance d between the first sheet portion 42A and the second sheet portion 42B. Thus, as depicted in FIG. 4, when the mobile device 1 is unfolded to put the digitizer part 41 in an active state, an overlap having a predetermined length Ov is formed between the third sheet portion 42C and the first sheet portion 42A and between the third sheet portion 42C and the first sheet portion 42A in a direction perpendicular to the input surface of the digitizer part 41. The predetermined length Ov of the overlap in this case is selected depending on the clearance between the third sheet portion 42C and the first and second sheet portions 42A and 42B. For example, in a case where the above-mentioned sheet thickness direction clearance is approximately 0.1 mm, the predetermined length Ov of the overlap may be 2 to 3 mm or longer, for example. The greater the sheet thickness direction clearance is, the larger the predetermined length Ov of the overlap may be.

In this case, as is evident from FIGS. 3 and 4, the first and second frame members 21 and 22 rotate, using the hinge parts 23 and 24 as pivot shaft positions, when the input apparatus transitions between the folded state and the fully unfolded state. At this point, the protection plate 25 is allowed to move in such a manner as to avoid a contact between the third sheet portion 42C disposed on the upper surface of the protection plate 25 and the first and second sheet portions 42A and 42B that are formed on an under surface of the digitizer part 41. Nevertheless, a slight contact between the third sheet portion 42C and the first and second sheet portions 42A and 42B is permitted.

In the embodiment, as discussed above, the third sheet portion 42C is not bent and remains flat on the upper surface of the protection plate 25 irrespective of the folding motion of the external casing 2. Therefore, the third sheet portion 42C does not deteriorate as a result of the folding motion of the external casing 2.

In the position detection sensor 4 of the mobile device 1 according to the embodiment, as described above, the electromagnetic sheet part 42 disposed on one surface of the digitizer part 41 is divided into the first sheet portion 42A and the second sheet portion 42B. At the position that is bent when the external casing 2 is folded, the predetermined distance d is provided, across which the electromagnetic sheet part 42 is not disposed. Because the electromagnetic sheet part 42 does not exist at the position that is significantly bent during a folding motion, it is possible to minimize the deterioration of the electromagnetic sheet part 42 due to the folding motion of the external casing 2.

Also, in the embodiment, the predetermined distance d where the electromagnetic sheet part 42 is not formed is covered with the third sheet portion 42C. Accordingly, the level of electromagnetic coupling between the loop coils of the digitizer part 41 and the electronic pen 10 does not change locally even across the predetermined distance d.

Further, in the embodiment described above, the third sheet portion 42C is spaced from the digitizer part 41 and from the first and second sheet portions 42A and 42B and is prevented from being bent during folding of the external casing 2. This completely eliminates the possibility of deterioration of the third sheet portion 42C attributable to the folding motion.

Modifications of the Above-Described Embodiment

In the above embodiment, the third sheet portion 42C is completely prevented from being bent irrespective of the folding motion of the external casing 2. However, as long as the third sheet portion 42C is prevented from being significantly bent, slight deformation into a curved surface is permitted because the third sheet portion 42C, having a narrow width, does not deteriorate much even when it transitions from a flat state to a curved state. Therefore, the third sheet portion 42C may be slightly bent when the external casing 2 is folded from the unfolded state.

In the above embodiment, the electromagnetic sheet part 42 including both the magnetic path material layer part 421 and the electromagnetic shield layer part 422 is divided into the first sheet portion 42A and the second sheet portion 42B. However, because the bending action does not damage the magnetic path material layer part 421 as much as the electromagnetic shield layer part 422, it is possible to divide only the electromagnetic shield layer part 422 into the first portion 4221 and the second portion 4222 in the first and second sheet portions 42A and 42B of the electromagnetic sheet part 42. In this case, the third sheet portion 42C may have only the electromagnetic shield layer part 4223 and not include a magnetic path material layer part.

In the position detection sensor 4 of the above embodiment, the third sheet portion 42C is configured as a separate entity disconnected from the digitizer part 41 as well as from the first and second sheet portions 42A and 42B of the electromagnetic sheet part 42.

Figure 5A:
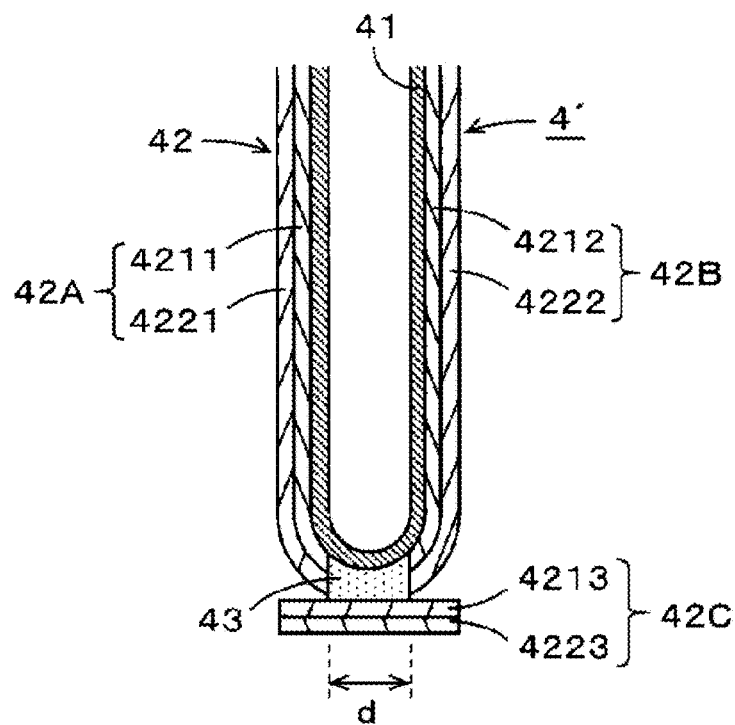
FIGS. 5A and 5B are drawings illustrating a position detection sensor according to another embodiment of the present disclosure.
Figure 5B:
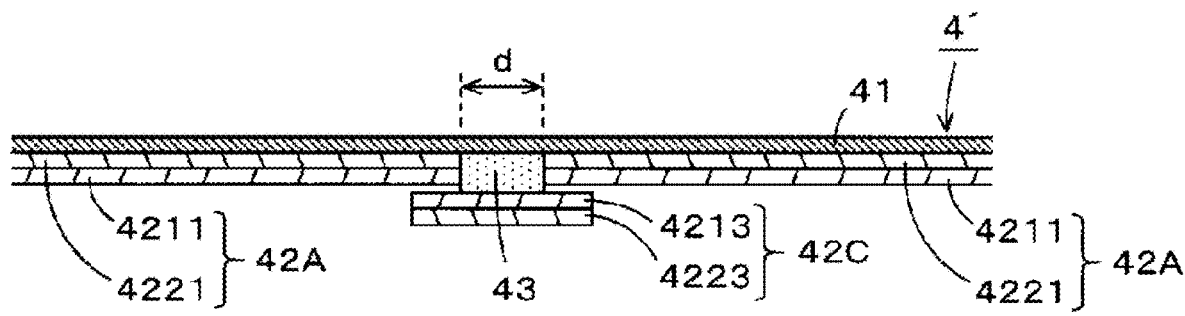

However, in a structure depicted in FIGS. 5A and 5B, for example, the position detection sensor 4 may have the third sheet portion 42C connected with the first and second sheet portions 42A and 42B of the electromagnetic sheet part 42.

FIGS. 5A and 5B depict an example of the position detection sensor having such configuration. It is to be noted that, although not depicted in FIGS. 5A and 5B, the flexible display element 3 is disposed on the surface of the digitizer part 41 opposite to the surface on which the first and second sheet portions 42A and 42B of the electromagnetic sheet part 42 are formed, as in the above-described embodiment.

FIG. 5A is a sectional view of a position detection sensor 4' of this example in a folded state. FIG. 5B is a sectional view of the position detection sensor 4' in its fully unfolded state following the folded state. It is to be noted that, in FIGS. 5A and 5B, components similar to those of the above-described embodiment are denoted by identical reference symbols, and their detailed description is omitted herein.

In the position detection sensor 4' of the example as depicted in FIGS. 5A and 5B, the predetermined distance d between the first and second sheet portions 42A and 42B is not left empty. A joining member 43 made of, for example, an elastically deformable resin is provided on the digitizer part 41 to fill the predetermined distance d. The thickness of the joining member 43 (i.e., the height from the surface of the digitizer part 41 opposite to the input surface thereof) is made larger than the thickness of the first and second sheet portions 42A and 42B.

Further, as depicted in FIGS. 5A and 5B, the third sheet portion 42C is attached to an end face of the joining member 43 opposite to the input surface of the digitizer part 41. In this case, the width of the third sheet portion 42C is larger than the predetermined distance d, so that there is a portion protruding from the joining member 43. The protruding portion is separate from the first and second sheet portions 42A and 42B to form a non-joining portion, as depicted in FIGS. 5A and 5B. As shown in FIG. 5A, the non-joining portion does not bend even when the digitizer part 41 and the first and second sheet portions 42A and 42B of the electromagnetic sheet part 42 of the position detection sensor 4' are bent.

As a result, the position detection sensor 4' of the example in FIGS. 5A and 5B also provides effects similar to those of the above-described embodiment.

Figure 6A:
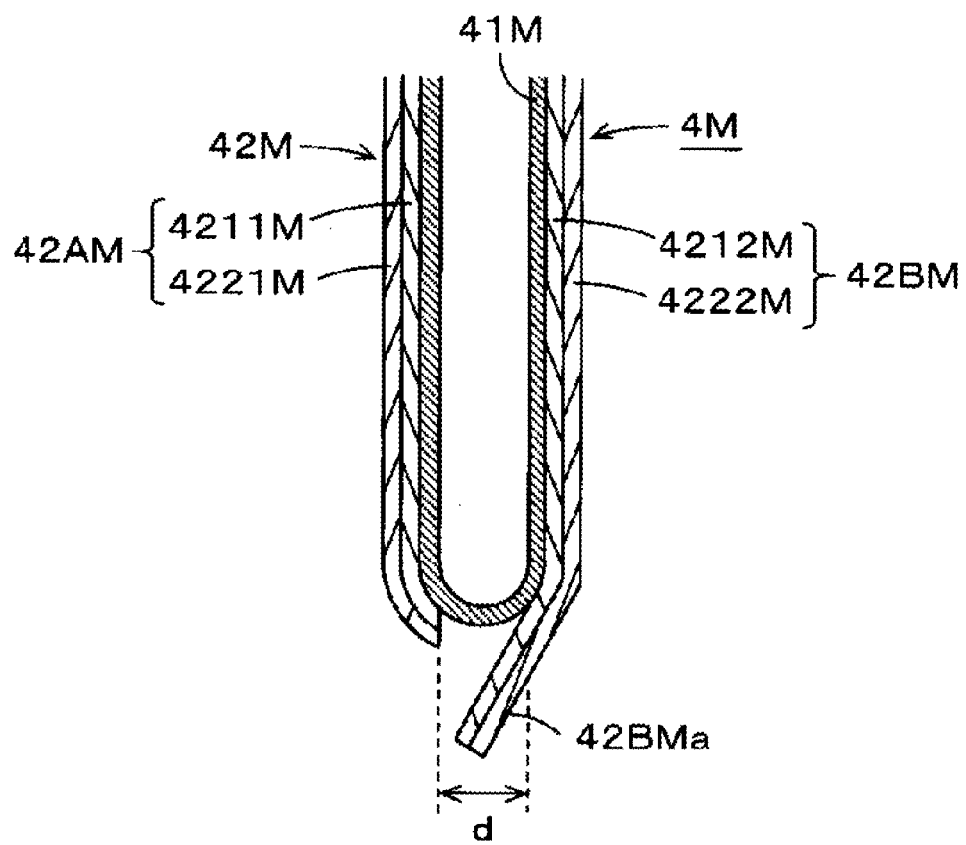
FIGS. 6A and 6B are drawings illustrating a position detection sensor according to another embodiment of the present disclosure.
Figure 6B:
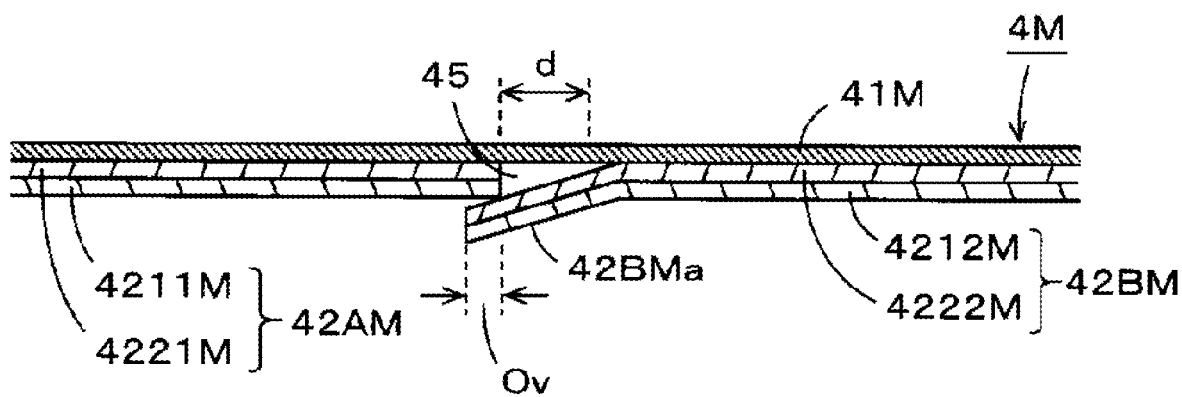
Figure 11:
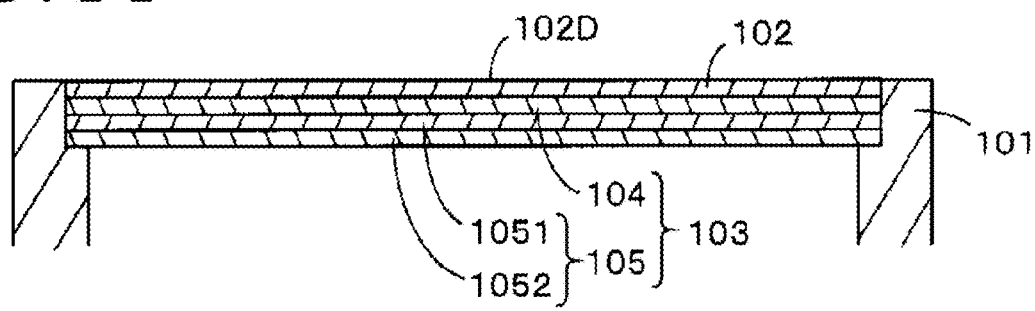
FIG. 11 is a drawing illustrating a configuration example of an existing position detection sensor.
Figure 12:
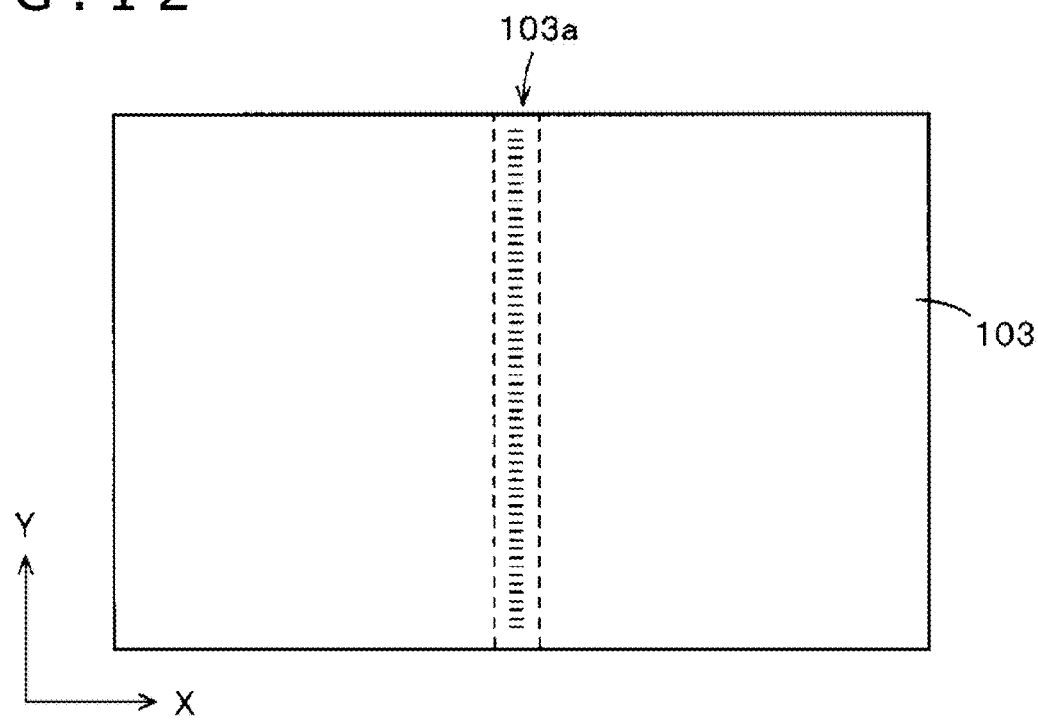
FIG. 12 is a drawing for explaining problems to be solved by the present disclosure.
Figure 13:
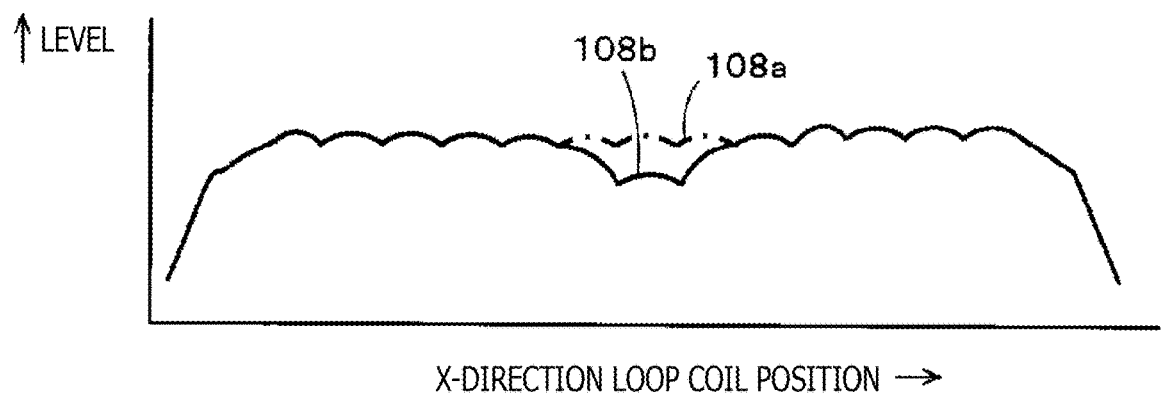
FIG. 13 is another drawing for explaining the problems to be solved by the present disclosure.

Next, FIGS. 6A and 6B depict an example of a position detection sensor 4M, which does not include the third sheet portion 42C as a disconnected separate entity. FIG. 6A is a sectional view of the position detection sensor 4M of this example in its folded state. FIG. 6B is a sectional view of the position detection sensor 4M in its fully unfolded flat state following the folded state. It is to be noted that, in FIGS. 6A and 6B, components similar to those of the above-described embodiment are denoted by identical reference symbols suffixed with M, and their detailed description is omitted herein.

In the position detection sensor 4M of the example in FIGS. 6A and 6B, as in the case of the electromagnetic sheet part 42 of the above embodiment, an electromagnetic sheet part 42M disposed on the surface of the digitizer part 41 opposite to the input surface thereof includes the first sheet portion 42AM and the second sheet portion 42BM spaced from each other near the bending location, as depicted in FIGS. 6A and 6B. At the bending location, a portion is created across the predetermined distance d over which the first and second sheet portions 42AM and 42BM are not attached.

However, in the example of FIGS. 6A and 6B, an extended edge part 42BMa is formed in such a manner that either the first sheet portion 42AM or the second sheet portion 42BM, the latter being selected in this example, may overlap with the other sheet portion, which is the first sheet portion 42AM in this example, in order to cover the predetermined distance d as depicted in FIGS. 6A and 6B.

Thus, in the position detection sensor 4M of the example in FIGS. 6A and 6B, in its fully unfolded flat state following the folded state as depicted in FIG. 6B, an overlap (overlapping portion) Ov is produced between the first sheet portion 42AM and the second sheet portion 42BM while a space 45 is created across the predetermined distance d between the first sheet portion 42AM and the second sheet portion 42BM.

When the mobile device is folded, the position detection sensor 4M of the example in FIGS. 6A and 6B that is configured as described above is also bent. However, the electronic sheet part 42M is divided into the first and second sheet portions 42AM and 42BM and therefore does not tend to deteriorate. When the mobile device is fully unfolded, the first and second sheet portions 42AM and 42BM that are separate from each other overlap. This prevents localized changes in the level of electromagnetic coupling between the digitizer part 41M and the electronic pen 10 at the position where the first and second sheet portions 42AM and 42BM are spaced apart from each other.

Other Embodiments and Modifications

It is to be noted that, while the embodiments described above are applied to examples of the mobile device wherein the external casing is valley-folded, they are also applicable to mobile devices wherein the external casing is mountain-folded.

The mobile device of the above-described embodiments uses a dual-pivot point hinge part as its folding mechanism. Alternatively, the mobile device may use a single-pivot point hinge part or a multi-pivot point hinge part having three or more pivot points.

FIGS. 7 and 8 are views illustrating a configuration example of a mobile device 1D that has multi-pivot point hinge parts and that is valley-folded via the hinge parts. FIGS. 7A, 7B and 7C outline how the mobile device 1D of this example is folded. The state of the mobile device 1D of this example can be changed from a folded state in FIG. 7A to a half-unfolded state in FIG. 7B, and from the half-unfolded state to a fully unfolded state in FIG. 7C. FIG. 8A is a schematic sectional view taken along line C-C in FIG. 7B. FIG. 8B is a schematic sectional view taken along line D-D in FIG. 7C.

In this example, an external casing (housing) 2D of the mobile device 1D has a first frame member 21D and a second frame member 22D coupled with each other in a valley-foldable manner at multi-pivot point hinge parts 23D and 24D (only the hinge part 23D is depicted in FIG. 8), as depicted in FIGS. 7A, 7B, and 7C and in FIGS. 8A and 8B.

In its fully unfolded state, the external casing 2D of the mobile device 1D of this example has a thin rectangular plate-like shape as depicted in FIG. 7C and FIG. 8B. In its folded state depicted in FIG. 7A and FIG. 8A, the external casing 2D of the mobile device 1D is approximately half as large as that in its fully unfolded state.

The mobile device 1D of this example has a similar configuration to that of the mobile device 1 of the embodiment described above with reference to FIGS. 1 through 4, with the exception of the hinge parts 23D and 24D. In the following description, components similar to those of the mobile device 1 are denoted by identical reference symbols suffixed with D, and their detailed description is omitted.

As depicted in FIG. 7C, the external casing 2D of the mobile device 1D of this example is configured such that, in its fully unfolded date, a display screen 3DP of a flexible display element 3D appears on one surface of the external casing 2D of the rectangular plate-like shape. Further, as depicted in FIGS. 7A and 7C and in FIGS. 8A and 8B, a position detection sensor 4D operable by electromagnetic induction coupling is overlaid on one side of the flexible display element 3D (on the underside (back side) of the flexible display element 3D) opposite to the side where the display screen 3DP is provided, in such a manner that the same region as that of the display screen 3DP becomes the sensor detection region.

When the mobile device 1D is unfolded as depicted in FIG. 7C, the position detection sensor 4D of this example detects the positions indicated by the electronic pen 10 that is a position indicator operable by electromagnetic induction coupling, by signal interaction with the electronic pen 10 through electromagnetic induction coupling.

Further, as depicted in FIGS. 8A and 8B, also in the mobile device 1D of this example, the position detection sensor 4D has a digitizer part 41D with one surface thereof facing the flexible display element 3D and an electromagnetic sheet part 42D disposed on the opposite surface of the digitizer part 41D.

As depicted in FIGS. 8A and 8B, as in the case of the electromagnetic sheet part 42 of the above-described mobile device 1, the electromagnetic sheet part 42D is divided into a first sheet portion 42AD, a second sheet portion 42BD, and a third sheet portion 42CD. The first sheet portion 42AD and the second sheet portion 42BD are spaced from each other by the predetermined distance d at the bending location of the digitizer part 41D. The third sheet portion 42CD covers the predetermined distance d between the first sheet portion 42AD and the second sheet portion 42BD.

As depicted in FIGS. 8A and 8B, as in the example of the above-described mobile device 1, the third sheet portion 42CD is arranged to be spaced apart from the first and second sheet portions 42AD and 42BD. It is to be noted that, although not depicted in FIGS. 8A and 8B, the third sheet portion 42CD is placed on a plate-like body such as a protection plate provided between the hinge parts 23D and 24D in a space between the multi-support points and the position detection sensor 4D.

Also, in the mobile device 1D of this example, as depicted in FIG. 8B, the third sheet portion 42CD covers the predetermined distance d between the first and second sheet portions 42AD and 42BD and provides overlapping portions Ov overlapping with the first and second sheet portions 42AD and 42BD in a direction perpendicular to the input surface of the digitizer part 41D.

The position detection sensor 4D of the mobile device 1D configured as described above also provides effects similar to those of the position detection sensor 4 of the above-described mobile device 1.

Explained next with reference to FIGS. 9 and 10 is a configuration example of a mobile device 1E that can be mountain-folded. The mobile device 1E is similar to the above-described mobile device 1D in that multi-pivot point hinge parts are provided.

Specifically, FIGS. 9A, 9B and 9C outline how the mobile device 1D of this example is folded. The state of the mobile device 1E of this example can be changed from a folded state in FIG. 9A to a half-unfolded state in FIG. 9B, and from the half-unfolded state to a fully unfolded state in FIG. 9C. FIG. 10A is a schematic sectional view taken along line E-E in FIG. 9B. FIG. 10B is a schematic sectional view taken along line F-F in FIG. 9C.

In this example, an external casing (housing) 2E of the mobile device 1E has a first frame member 21E and a second frame member 22E coupled with each other in a mountain-foldable manner at multi-pivot point hinge parts 23E and 24E (only the hinge part 23E is depicted in FIG. 10), as depicted in FIGS. 9A, 9B, and 9C and in FIGS. 10A and 10B.

In its fully unfolded state in FIG. 9C and in FIG. 10B, the external casing 2E of the mobile device 1E of this example has a thin rectangular plate-like shape. In its folded state in FIG. 9A and in FIG. 10A, the external casing 2E of the mobile device 1E is approximately half as large as that in its fully unfolded state.

The configuration of the mobile device 1E of this example is similar to those of the mobile device 1 and the mobile device 1D of the above-described embodiments, except for the hinge parts 23D and 24D and for the mountain-folding configuration adopted instead of the valley-folding configuration. In the following description, components similar to those of the mobile device 1 are denoted by identical reference symbols suffixed with E, and their detailed description is omitted.

In its folded state in FIG. 9A and FIG. 10A as well as in its half-folded state in FIG. 9B, the mobile device 1E of this example is configured such that a display screen 3EP of a flexible display element 3E is exposed outside. Further, the mobile device 1E of this example has a position detection sensor 4E overlaid on one side of the flexible display element 3E (on the underside (back side) of the flexible display element 3E) opposite to the side where the display screen 3EP is provided, in such a manner that the same region as that of the display screen 3EP becomes the sensor detection region. The position detection sensor 4E is coupled with the electronic pen 10 through electromagnetic induction coupling.

Not only in the fully unfolded state but also in the half-folded or fully folded state as depicted in FIGS. 9A, 9B, and 9C, the position detection sensor 4E of this example detects the positions indicated by the electronic pen 10 that is a position indicator operable by electromagnetic induction coupling, by signal interaction with the electronic pen 10 through electromagnetic induction coupling.

Further, as depicted in FIGS. 10A and 10B, also in the mobile device 1E of this example, the position detection sensor 4E has a digitizer part 41E with one surface thereof facing the flexible display element 3E and an electromagnetic sheet part 42E disposed on the opposite surface of the digitizer part 41E.

Also, as depicted in FIG. 10B, as in the case of the electromagnetic sheet part 42 of the above-described mobile device 1, the electromagnetic sheet part 42E of the mobile device 1E of this example is divided into a first sheet portion 42AE, a second sheet portion 42BE, and a third sheet portion 42CE. The first sheet portion 42AE and the second sheet portion 42BE are spaced from each other by the predetermined distance d at the bending location of the digitizer part 41E. The third sheet portion 42CE covers the predetermined distance d between the first sheet portion 42AE and the second sheet portion 42BE.

As depicted in FIGS. 10A and 10B, as in the example of the above-described mobile device 1, the third sheet portion 42CE is arranged to be spaced apart from the first and second sheet portions 42AE and 42BE. It is to be noted that, although not depicted in FIG. 10, the third sheet portion 42CE is placed on a plate-like body such as a protection plate provided between the hinge parts 23E and 24E in a space between the multi-support points and the position detection sensor 4E.

Also, in the example in FIG. 10, as depicted in FIG. 10B, the third sheet portion 42CE covers the predetermined distance d between the first and second sheet portions 42AE and 42BE and provides overlapping portions Ov overlapping with the first and second sheet portions 42AE and 42BE in a direction perpendicular to the input surface of the digitizer part 41E.

The position detection sensor 4E of the mobile device 1E configured as described above also provides effects similar to those of the position detection sensor 4 of the mobile device 1 described above and those of the position detection sensor 4D of the mobile device 1D discussed above.

It is to be noted that, while the present disclosure is applied to cases where the external casing of the mobile device is folded in two (folded in half) in the above-described embodiments, the present disclosure can also be applied in cases where the external casing is folded in three or more. Needless to say, the disclosure can be equally well applied in a case where the external casing is folded in three or more and where a mountain-fold and a valley-fold coexist.

DESCRIPTION OF REFERENCE SYMBOLS

1: Mobile device
2: External casing
3: Flexible display element
4: Position detection sensor
21: First frame member
22: Second frame member
23, 24: Hinge part 41: Digitizer part
42: Electromagnetic sheet part
42A: First sheet portion
42B: Second sheet portion
42C: Third sheet portion
421: Magnetic path material layer part
422: Electromagnetic shield layer part

The invention claimed is:

1. A position detection sensor comprising:
a digitizer including an electrode configured to be coupled with a position indicator by electromagnetic induction coupling, the digitizer having an input surface for receiving input from the position indicator;
electromagnetic sheets disposed to cover a surface of the digitizer opposite from the input surface, the electromagnetic sheets including:
a first electromagnetic sheet and a second electromagnetic sheet being spaced apart from one another by a distance when the digitizer is in an unfolded state at a bending location where the digitizer is bent, and
a third electromagnetic sheet that, when the digitizer is in the unfolded state, covers across the distance and that overlaps with the first electromagnetic sheet and with the second electromagnetic sheet in a direction perpendicular to the input surface of the digitizer; and
an elastically deformable member arranged between the third electromagnetic sheet and the surface of the digitizer opposite from the input surface.

2. The position detection sensor according to claim 1, wherein, when the digitizer is in the unfolded state, the third electromagnetic sheet is spaced apart from the first electromagnetic sheet and from the second electromagnetic sheet in the direction perpendicular to the input surface of the digitizer.

3. The position detection sensor according to claim 1, wherein the elastically deformable member is positioned across the distance between the first electromagnetic sheet and the second electromagnetic sheet, wherein the third electromagnetic sheet is fixedly attached to the elastically deformable member.

4. The position detection sensor according to claim 1, wherein the third electromagnetic sheet does not bend when the digitizer is bent.

5. The position detection sensor according to claim 1, wherein the electromagnetic sheets include an electromagnetic shield layer.

6. The position detection sensor according to claim 1, wherein the electromagnetic sheets include an electromagnetic shield layer and a magnetic path material layer disposed on a surface of the electromagnetic shield that is facing the digitizer.

7. The position detection sensor according to claim 1, wherein the digitizer is bent to a side of the input surface.

8. The position detection sensor according to claim 1, wherein the digitizer is bent to a side opposite to a side of the input surface.

9. The position detection sensor according to claim 1, wherein the digitizer is bent multiple times.

10. An input apparatus comprising:
a position detection sensor operable by electromagnetic induction coupling; and
an external casing member including a hinge part configured to transform the position detection sensor between a folded state and an unfolded state, wherein
the position detection sensor includes
a digitizer including an electrode configured to be coupled with a position indicator by electromagnetic induction coupling, the digitizer having an input surface for receiving input form the position indicator,
electromagnetic sheets disposed to cover a surface of the digitizer opposite from the input surface, the electromagnetic sheets including:
a first electromagnetic sheet and a second electromagnetic sheet being spaced apart from one another by a distance when the digitizer is in an unfolded state at a bending location where the digitizer is bent, and
a third electromagnetic sheet that, when the digitizer is in the unfolded state, covers across the distance and that overlaps with the first electromagnetic sheet and with the second electromagnetic sheet in a direction perpendicular to the input surface of the digitizer; and
an elastically deformable member arranged between the third electromagnetic sheet and the surface of the digitizer opposite from the input surface.

11. The input apparatus according to claim 10, further comprising:
a bendable sheet-like display element, wherein
the position detection sensor is disposed on a surface of the display element opposite to a display screen thereof in such a manner as to be overlaid on the display screen, and
the hinge part of the external casing member allows the display element and the position detection sensor to transition between the folded state and the unfolded state.

12. The input apparatus according to claim 10, wherein, when the digitizer is in the unfolded state, the third electromagnetic sheet is spaced apart from the first electromagnetic sheet and from the second electromagnetic sheet in the direction perpendicular to the input surface of the digitizer.

13. The input apparatus according to claim 10, wherein the third electromagnetic sheet does not bend when the digitizer is bent.

14. The input apparatus according to claim 10, wherein the electromagnetic sheets include an electromagnetic shield layer.

15. The input apparatus according to claim 10, wherein the electromagnetic sheets include an electromagnetic shield layer and a magnetic path material layer disposed on a surface of the electromagnetic shield that is facing the digitizer.

16. The input apparatus according to claim 10, wherein the digitizer is bent to a side of the input surface.

17. The input apparatus according to claim 10, wherein the digitizer is bent to a side opposite to a side of the input surface.

18. The input apparatus according to claim 10, wherein the digitizer is bent multiple times.

* * * * *